United States Patent [19]
Brockway et al.

[11] 3,944,100
[45] Mar. 16, 1976

[54] CONTAINMENT COATING COMPOSITION

[75] Inventors: M. Clifford Brockway, Columbus; Robert E. Sharpe, Worthington, both of Ohio

[73] Assignee: Liberty Glass Company, Sapulpa, Okla.

[22] Filed: Mar. 18, 1974

[21] Appl. No.: 451,824

[52] U.S. Cl.............. 215/1 C; 428/35; 260/29.4 R; 260/29.4 UA; 260/851
[51] Int. Cl.² ................ B65D 23/00; C08L 61/20
[58] Field of Search............ 117/16, 28, 94, 124 E, 117/161 LN, 161 UC, 161 UN, 161 UT; 260/29.4 R, 29.4 UA, 851; 215/1 R, 1 C, 12 R; 428/35

[56] References Cited
UNITED STATES PATENTS

| | | | |
|---|---|---|---|
| 3,379,559 | 4/1968 | Gerhardt........................ | 117/124 X |
| 3,713,867 | 1/1973 | Parkinson et al................ | 117/54 |
| 3,772,061 | 11/1973 | McCoy et al..................... | 117/94 X |
| 3,823,032 | 7/1974 | Ukai.............................. | 117/124 X |

Primary Examiner—Michael R. Lusignan
Attorney, Agent, or Firm—Koenig, Senniger, Powers and Leavitt

[57] ABSTRACT

A containment coating for glass containers. The composition includes a principal film-forming constituent comprising an acrylate latex containing a particulate resin comprising a copolymer of acrylonitrile and ethyl acrylate. The coating also contains at least one additional latex whose presence enhances the containment properties of the film after curing. Two such auxiliary latexes exhibit this capability and the coating composition contains either or both of them. One of these is a vinyl latex whose resin solids comprise a copolymer of ethylene and vinyl acetate. The other is a vinyl/acrylic latex whose resin solids comprise a copolymer of vinyl acetate and a lower alkyl acrylate. Hexamethoxymethylmelamine or a methylated urea-formaldehyde resin is included as a cross-linking agent and either polyacrylamide or a high molecular weight water-soluble polyethylene oxide resin is present as a thickener and a thixotrope. A method of producing a novel coated glass container of improved mechanical service strength is also disclosed.

6 Claims, No Drawings

CONTAINMENT COATING COMPOSITION

BACKGROUND OF THE INVENTION

This invention relates to the field of glass containers and more particularly to a container of improved mechanical service strength and shatter resistance having an outside containment coating constituted by a plastic film.

In the container industry, substantial efforts have been devoted to developing methods for improving the impact and burst strength of glass containers without significantly adding to the cost of producing such containers. Improvement in impact and burst strength can provide not only important economic benefits through reduced attrition, but can also make critical contributions to the personal safety of those who fill, handle and use glass containers.

A substantial effort has been underway in the art to develop containment coatings which improve the resistance of a glass beverage container to impact or burst failure. In recognition of the fact that prevention of such failure under all possible conditions of handling is an objective whose economical attainment is difficult, if not impossible, much effort has also been devoted to the development of means for mitigating the consequences of the failure of a glass container. Thus, important objects have been to minimize both the degree of fragmentation and the extent of scatter of the fragments produced when a glass bottle fails.

Each of the properties of the impact resistance, burst strength, resistance to fragmentation and minimization of scatter is particularly important where a beverage bottle is used for packaging a carbonated beverage. Bottles for carbonated beverages are routinely exposed to internal pressures in the range of of about 50 psig. If and when such a bottle is broken, the resulting fragments can be propelled at high velocity by the carbon dioxide. If these fragments strike a person, serious injuries may result. Occasionally, a beverage bottle explodes due to the force of internal pressure alone. Serious injuries have been caused by exploding beverage bottles.

As a means of improving the mechanical properties of beverage bottles in the above-noted respects, it has been proposed to provide such bottles with a "containment" or protective coating. Compositions and processes are known, for example, which may be utilized to provide a glass container with a relatively thick coating of styrene foam. Styrene foam coatings are esthetically undesirable since they are white and opaque, thus preventing observation of the contents of the bottle. Glass containers also are known to have an outer lubricating film of polyethylene over an intermediate layer of a metal oxide, such as tin or titanium oxide, for abrasion protective purposes. However, these do not in themselves provide satisfactory impact resistance and containment.

As a result of the conditions encountered in the filling, handling and usage of a beverage bottle, a containment coating must meet a number of diverse criteria in addition to the mechanical properties noted above. Thus, in order to maintain its own integrity and effectiveness, the coating should be substantially resistant to abrasion. To avoid interference with visual observation of the bottle's contents, the coating preferably possesses a high degree of clarity. To survive general usage and, in particular, to survive bottling plant processing, the coating should be resistant to both alkali and hot water. In order to minimize fire hazards in the process of coating the bottle, the containment coating composition should not include significant proportions of flammable organic solvents, and desirably should be water-based. Finally the containment coating must be inexpensive to formulate and apply, failing which its use and application to beverage bottles is not feasible or practically economic.

A useful containment composition is described in the coassigned application of McCoy and Sharpe, Ser. No. 189,392, filed Oct. 14, 1971, now U.S. Pat. No. 3,772,061 dated Nov. 13, 1973. The coatings described in this application have a high degree of clarity and alkali resistance and are also characterized by a relatively high degree of lubricity which minimizes damage which might otherwise be incurred in the handling incident to the bottle manufacturing process. The coatings described in the aforesaid patent also provide protection against abrasion, impart improved burst and impact strength, and reduce the extent of fragmentation and scatter in the event that a bottle to which they have been applied does fail. Although the coatings described by McCoy and Sharpe are substantially superior to many previously known coatings in protecting a bottle against burst and shatter, a continuing need has existed for further improvement in coating compositions adapted for this purpose.

SUMMARY OF THE INVENTION

Among the several objects of the present invention, therefore, may be noted the provision of a coating composition which, when applied to the surface of a glass container and cured, imparts improved impact strength to such containers; the provision of such a composition which yields a cured coating imparting improved burst strength retention to the container; the provision of a composition of the character described which yields a cured coating which retards both the degree of fragmentation and the extent of scatter of the glass should the container break; the provision of such a composition which yields a transparent coating of satisfactory clarity; the provision of such a composition which yields a coating resistant to both alkali and hot water; the provision of such a composition which is water-based and does not require the presence of flammable organic solvents; the provision of a novel glass container having such a cured composition adhered to the outside surface thereof; and the provision of a method for imparting improved mechanical service strength to a glass container with such compositions. Other objects and features will be in part apparent and in part pointed out hereinafter.

Briefly, therefore, the present invention is directed to a thixotropic composition which is useful in forming the containment coating for glass containers. The basic constituent of the composition is an acrylate latex containing a particulate resin comprising a copolymer of acrylonitrile and ethyl acrylate. The composition further includes up to about 40 parts by weight per 100 parts by weight of said acrylate latex of a vinyl latex containing a particulate resin comprising a copolymer of ethylene and vinyl acetate and up to about 40 parts by weight per 100 parts by weight of said acrylate latex of vinyl/acrylic latex containing a particulate resin comprising a copolymer of vinyl acetate and a lower alkyl acrylate. The sum of the proportions of the vinyl latex and the vinyl/acrylic latex is between about 15 and about 40 parts by weight per 100 parts by weight of the acrylate latex and the total resin solids content of the composition is at least about 45% by weight. As a cross-linking agent, the composition further includes between about 1.8 and about 7.5 parts by weight per 100 parts by weight of said acrylate latex of a cross-linking agent selected from the group consisting of hexamethoxymethylmelamine and a methylated urea-formaldehyde resin. Also included in the composition is a proportion of a thickening agent selected from the group consisting of polyacrylamide and a high molecular weight water-soluble polyethylene oxide resin sufficient to impart to the composition a Brookfield viscosity of between about 2,000 and about 9,000 cps at 1 rpm and a Brookfield viscosity of between about 600 and 2,400 cps at 5 rpm.

The invention is also directed to a glass container having adhered to the outside surface thereof a cured containment coating derived from curing the above-described coating composition.

The invention is also directed to a method of imparting improved mechanical service strength to a glass container. The method comprises the steps of contacting the outside surface of the container with the above-noted coating composition; and curing such composition to provide a containment coating which increases the container's resistance to both breakage and abrasion.

DESCRIPTION OF THE PREFERRED EMBODIMENTS

The present invention constitutes a significant improvement in containment coatings of the type described by McCoy and Sharpe in the aforesaid U.S. Pat. No. 3,772,061. In accordance with the instant invention, it has now been discovered that the properties of the cured film may be materially enhanced by including an auxiliary latex in a McCoy and Sharpe type coating composition. The auxiliary latex may be a vinyl latex whose resin solids comprise a copolymer of ethylene and vinyl acetate or a vinyl/acrylic latex whose resin solids comprise a copolymer of vinyl acetate and a lower alkyl acrylate. Alternatively, both the vinyl latex and the vinyl/acrylic latex may be included in the coating composition.

The coating composition of the present invention may be readily applied to the surface of a glass container, as by dipping, and is readily cured into a relatively clear, glossy, tough and adherent coating on the outer surface of the container. The coating typically has a thickness on the order of 2–4 mils, depending on the conditions under which the container is contacted with the coating composition. The cured coating is not severely affected by immersion in hot alkali solution. If sufficiently cured, the coating is resistant to 3 percent alkali solution containing 2.5 percent sodium hydroxide and 0.5 percent trisodium phosphate at 120°–150° F. for about 10–30 minutes. After exposure to line simulation abrasion, the coated containers of this invention exhibit burst strengths substantially higher than the burst strengths of standard production bottles which have been similarly exposed to line simulation but have not received the coating composition of the invention. Moreover, the coated bottles of the present invention are distinctly superior to that of McCoy and Sharpe U.S. Pat. No. 3,772,061 with respect to degree of fragmentation and scatter of fragments when subjected to drop tests.

The coated container of the invention possesses a high degree of abrasion resistance and is well adapted to the receipt of a thin exterior film of polyethylene which provides a high degree of lubricity and further contributes to the resistance of the container to abrasion during processing and handling.

The abrasion resistance imparted by the cured coating, particularly where an outer coating of polyethylene is included, is especially advantageous in the case of bottles which have been subjected to chemical strengthening by means of ion exchange. Methods are known in the art by which a thin layer adjacent the outside surface of a bottle is placed under compressive stress by exchanging the principal cations thereof for other cations of either larger or smaller ionic diameter. The provision of a thin compressed "ion exchanged" outer layer substantially increases the strength of the bottle, but due to its lack of substantial thickness, such a layer is highly subject to damage on abrasion, with consequent loss of the extra strength which the layer originally imparts. The presence of an abrasion resistant outer coating derived from the coating compositions of the invention protects the thin compressively-stressed layer from damage, and preserves the strength which it imparts to the bottle.

In addition to substantially improving the serviceability and handling safety of glass containers, the compositions of the present invention are relatively inexpensive to formulate and apply. Since they are water-based, moreover, the compositions need not contain any flammable organic solvents, thus avoiding any significant first hazards in the process of their application and curing.

The principal film-forming constituent of the composition of the invention is an acrylate latex which preferably contains at least about 45% by weight or more resin solids. The preferred latex constituent is that sold under the trade designation "Hycar 2600 × 138" by the B. F. Goodrich Company. This latex as a specific gravity of about 1.07 and contains approximately 50% by weight of a particulate resin constituted by a copolymer of acrylonitrile and ethyl acrylate. Approximately 70% by weight of the repeating units of the resin copolymer are derived from ethyl acrylate, and approximately 30% by weight of the repeating units of the copolymer are derived from acrylonitrile. The specific gravity of the resin is about 1.14. The emulsifying agent in the latex is a synthetic anionic surfactant. As those skilled in the art will recognize, other copolymers of acrylonitrile and ethyl acrylate having the necessary resin solids content could be substituted for the copolymer utilized in "Hycar", and various other surfactants could be substituted for the emulsifying agent present therein.

Substantial enhancement of the toughness and containment properties of the cured film is realized by the inclusion of a vinyl latex whose resin solids comprise a copolymer of ethylene and vinyl acetate and/or a vinyl/acrylic latex whose resin solids comprise a copolymer of vinyl acetate and a lower alkyl acrylate. In this context, lower alkyl includes alcohol residues containing up to about 8 carbon atoms. Either the vinyl latex, the vinyl/acrylic latex or a combination thereof may constitute up to 40 parts by weight of the composition per 100 parts by weight of the acrylate latex. To realize a significant improvement of containment properties, the sum of the proportion of the vinyl latex and vinyl/acrylic latex should be at least about 15 parts by weight per 100 parts by weight of the acrylate latex. When used as a component in the composition of the invention, each of these latexes should have a resin solids content of at least about 45% by weight.

Either the vinyl latex or the vinyl/acrylic latex contributes to improved containment properties of the cured film. The vinyl latex containing ethylene/vinyl acetate resin solids is slightly superior in its contribution to containment properties but the vinyl/acrylic latex containing vinyl acetate/acrylic ester resin solids is significantly superior in its contribution to water and alkali resistance, and on balance, therefore, the vinyl/acrylic latex is preferred. In a particularly preferred embodiment of the invention, the coating composition contains approximately 25 parts by weight of the vinyl/acrylic latex containing at least about 45% by weight resin solids.

Among the vinyl latexes which have been found useful in the composition of the invention are those sold under the trade designations "Airflex 120" and "Airflex 500" by Air Products and Chemicals, Inc. The resin component of each of these latexes contains a relatively high proportion of vinyl acetate which constitutes greater than 50% by weight with the balance being predominantly ethylene. "Airflex 120" has a minimum resin solids content of 52% by weight, utilizes an anionic surfactant system, and has a viscosity of 800–1,200 cps measured on a Brookfield LVF viscometer at 60 rpm and 77° F. A film produced from this latex has a glass transition temperature of −20° C., an ultimate tensile strength of 600 psi, and an ultimate elongation of 285%. "Airflex 500" has a minimum solids content of 55% by weight, a viscosity range of 200–500 cps measured on a Brookfield viscometer Model LVF at 60 rpm and 25° C. and a pH range of 5.0–5.6.

A highly desirable vinyl/acrylic latex is that sold under the trade designation "Polyco 2114" by the Borden Chemical Company. This latex has a resin solids content of 46±1% and a resin solids particle size of 0.5μ. It exhibits a Brookfield viscosity of 500–1,200 cps at 30 rpm using a No. 3 spindle and a pH at 25° C. of 4.5–5.5.

Either hexamethoxymethylmelamine or a methylated urea-formaldehyde resin may serve as a cross-linking agent in the curing of the coating composition of the invention. The pressure of between about 1.8 and about 7.5 parts cross-linking agent per 100 parts by weight acrylate latex in the coating formulation promotes the formation of a cured coating film of high strength and hardness which is resistant to both hot water and alkali. A hexamethoxymethylmelamine especially suitable for use in the invention is that sold under the trade designations "Cymel 300", "Cymel 301" or "Cymel 303" by American Cyanamid Company. A useful methylated ureaformaldehyde resin is that sold under the trade designation "Beetle 60" by American Cyanamid Company.

The viscosity of the coating composition determines both the wet film thickness obtained in application of the coating to the surface of a container and the resistance of the wet film to sagging or running prior to and during the curing operation. Under the moderate shear conditions encountered during application of the composition, accomplished, for example, by dipping, it is preferable that the coating composition have a slightly lower viscosity than is desired for dimensional integrity of the wet film under the low shear conditions which are maintained after application of the coating composition is complete. Thus, the coating composition of the invention is thixotropic, preferably having a Brookfield viscosity of between about 2,000 and about 9,000 cps at 1 rpm using a No. 2 spindle, and a Brookfield viscosity of between about 600 and about 2,400 cps at 5 rpm using a No. 2 spindle. Having these viscosity characteristics, the composition can be applied as a relatively thick film which does not run, sag, crack or craze during or after the curing process.

The coating compositions of the invention are thickened and rendered thixotropic by the presence of either polyacrylamide, a water-soluble high molecular weight polyethylene oxide resin, or both. A sufficient amount of thickener is included to impart a Brookfield viscosity of between about 2,000 and about 9,000 cps at 1 rpm (No. 2 spindle) and between about 600 and about 2,400 cps at 5 rpm (No. 2 spindle). Typically, the thickening agent content is between about 0.01 and about 0.08 parts by weight per 100 parts by weight latex. Where polyacrylamide is used as the thickening agent, it preferably has a high molecular weight and is slightly anionic. An illustratively useful polyacrylamide is that sold under the trade designation "Polyhall 295" by Stein, Hall & Company. A satisfactory polyethylene oxide resin having a molecular weight of approximately four million is sold under the trade designation "Polyox WSR-301" by Union Carbide Corporation.

The viscosity of a given coating formulation can be adjusted by further addition of polyacrylamide or polyethylene oxide resin, which further thickens the composition, or by addition of water, which reduces the composition's viscosity.

The shelf life of a composition of this invention, and its stability at elevated operating temperatures in the process of coating bottles, is increased if the composition is alkaline. Preferably, the composition has a pH of at least about 8.0 At this pH the composition has a shelf life of about 30–35 days at 75°–80° F. The freeze/thaw characteristics of the composition are also good. The alkalinity of the coating composition may be adjusted by the addition thereto of small proportions of a base such as, for example, ammonium hydroxide, sodium hydroxide, dimethylaminoethanol or other bases known to those skilled in the art.

The coating compositions of the invention are preferably prepared by adding the cross-linking agent and a dilute aqueous solution of the thickener to the latex components in a suitable mixing vessel. Typically, a 0.5–1 percent by weight solution of thickener is utilized. As noted, a base is preferably included also to adjust the pH of the composition to approximately 8.0 or slightly higher. Mixing should be thorough to insure uniform distribution of all components, but should be not so vigorous as to entrap significant amounts of air in the composition. Air entrapment may result in bubble formation which can result in the appearance of voids in the coating after application to a bottle or other glass container.

In accordance with the method of the invention, the coating compositions may be applied to the surface of a glass container by any suitable means, for example, spraying. Preferably, however, the container surface is contacted with a composition of the invention by dipping the container therein. Where a dipping process is employed, the container is conveniently withdrawn from the coating composition bath at a rate of between about 4 in./min. and about 3 ft./min., typically about 1 ft./min. Where the coating formulation has a Brookfield viscosity in the range of 1,000–2,000 cps at 5 rpm using a No. 2 spindle, a wet film thickness of approximately 4 mils is obtained at a 1 ft./min. withdrawal rate. To avoid crazing of the cured coating, the wet film thickness is preferably limited to about 2½ mils where the formulation contains a vinyl latex having ethylene/vinyl acetate resin solids. Although withdrawal rates up to 3 ft./min. are feasible, the container is preferably withdrawn at a rate less than about 12 in./min. to insure a high degree of uniformity of thickness throughout the film. The wet film is rapidly dried and its latex resin constituents cross-linked at elevated temperatures to produce a cured coating. Conveniently, curing may take place in a forced air oven at a temperature of between about 350° F. and 375° F. for between about 3 and about 30 minutes.

According to a preferred embodiment of the invention, an outer coating of polyethylene is applied following curing of the acrylate coating. The outer coating of polyethylene is most conveniently applied by spraying, and does not require further treatment.

The following examples illustrate the invention.

EXAMPLE 1

To an acrylate latex, sold under the trade designation "Hycar 2600 × 138" by B. F. Goodrich Company (100 parts by weight), was added a vinyl acetate/acrylic latex, sold under the trade designation "Polyco 2114" by Borden Chemical Company (25 parts by weight), hexamethoxymethylmelamine, sold under the trade designation "Cymel 303" by American Cyanamid Company (4 parts by weight), and a 1% by weight solution of a polyacrylamide, sold under the trade designation "Polyhall 295" by Stein, Hall & Company (4 parts by weight). The resulting mixture was agitated at low speed until all of the components were uniformly distributed. Aqueous ammonium hydroxide solution was added to adjust the pH of the mixture to above 8.0. A beverage bottle was dip coated with the resulting composition and the wet film thus formed was cured at 350° F. for 10 minutes. This coating was exposed to a solution of 2.5% sodium hydroxide and 0.5% trisodium phosphate at 120° F. for 20 minutes. After such exposure, the film showed very slight blush, no tack, and good tear resistance.

EXAMPLE 2

To "Hycar 2600 × 138" (100 parts by weight), was added an ethylene/vinyl acetate latex, sold under the trade designation "Airflex A 500" by Air Products and Chemicals, Inc. (10 parts by weight), "Polyco 2113" (10 parts by weight), "Cymel 303" (4 parts by weight), and a 1% by weight solution of "Polyhall 295" (6 parts by weight). The resulting mixture was agitated at low speed until all of the components were uniformly distributed. Aqueous ammonium hydroxide solution was added to adjust the pH of the mixture to above 8.0. A beverage bottle was dip coated with the resulting composition and the wet film thus formed was cured at 350° F. for 10 minutes. This coating was exposed to a solution of 2.5% sodium hydroxide and 0.5% trisodium phosphate at 110° F. for 20 minutes. After such exposure, the film showed slight blush, no tack, and good tear resistance.

EXAMPLE 3

To "Hycar 2600 × 138" (100 parts by weight), was added an ethylene/vinyl acetate latex sold under the trade designation "Airflex TR-120" by Air Products and Chemicals, Inc. (20 parts by weight), "Cymel 303" (6 parts by weight), and a 1% by weight solution of "Polyhall 295" (6 parts by weight). The resulting mixture was agitated at low speed until all of the components were uniformly distributed. Aqueous ammonium hydroxide solution was added to adjust the pH of the mixture to above 8.0. Ten-ounce beverage bottles were dip coated with the resulting composition and the wet film thus formed was cured at 350° F. for 10 minutes.

Comparative drop tests were conducted utilizing the bottles of this example, bottles coated in accordance with the aforesaid U.S. Pat. No. 3,772,061, and uncoated standard 10-ounce production bottles. Each bottle was drop tested by filling it with water, leaving a head space of 12 cc., pressurizing to 50 psig with argon and then dropping the bottle from a height of 4 ft. in a horizontal attitude, i.e., the longitudinal axis of the bottle was parallel to the surface onto which it was dropped. The pressurized bottles were dropped onto a concrete surface covered with 1/16-inch thick vinyl floor tile. To determine the degree of containment, a count was made of the number of fragments having at least one dimension of ½ inch or larger lying within specified ranges of diameters from the point of impact. The results of these tests are set forth in Table I below. Coating of bottles in accordance with U.S. Pat. No. 3,772,061 is described in Example 5, infra.

TABLE I

COMPARISON OF FRAGMENT DISTRIBUTION FROM DROP FRACTURE OF PRESSURIZED 10-OUNCE BEVERAGE BOTTLES (COATED AND UNCOATED)

| Example | Coating Composition, Parts By Wt. | | | | | Coating Thickness, mils | Spatial Distribution of Fracture Fragments About the Impact Point[a] (number of fragments collected in indicated zones) | | |
|---|---|---|---|---|---|---|---|---|---|
| | Acrylate Latex (b) | Vinyl Latex (c) | Vinyl Acrylic Latex (d) | Polyacrylamide (e) | Hexamethoxymethyl melamine (f) | | 0–5′ Dia | 5′–10′ Dia | 10′ Dia |
| | (No Coating) | | | | | | 71 | 11 | 5 |
| 3 | 100 | 20 | — | 6 | 4 | 3.4 | 11 | 1 | 0 |
| 4 | 100 | — | 40 | 6 | 4 | 2.7 | 1 | 3 | 1 |
| 5 | 100 | — | — | 5 | 4 | 2.75 | 31 | 9 | 1 |
| 6 | 100 | — | 25 | 4 | 4 | 2.6 | 2 | 9 | 1 |

TABLE I-continued

COMPARISON OF FRAGMENT DISTRIBUTION FROM DROP FRACTURE OF PRESSURIZED 10-OUNCE BEVERAGE BOTTLES (COATED AND UNCOATED)

| Example | Coating Composition, Parts By Wt. | | | | | Coating Thickness, mils | Spatial Distribution of Fracture Fragments About the Impact Point[a] (number of fragments collected in indicated zones) | | |
|---|---|---|---|---|---|---|---|---|---|
| | Acrylate Latex (b) | Vinyl Latex (c) | Vinyl Acrylic Latex (d) | Polyacrylamide (e) | Hexamethoxymethyl melamine (f) | | 0–5′ Dia | 5′–10′ Dia | 10′ Dia |
| 7 | 100 | 10 | 20 | 6 | 4 | 2.7 | 3 | 8 | 2 |

[a]Bottles were filled to 12 cc. head space (gas space), pressurized to 50 psig and dropped 4 feet horizontally onto 1/16-inch thick vinyl tile on concrete
[b]Ethyl acrylate/acrylonitrile emulsion "Hycar No. 2600 × 138" sold by B. F. Goodrich Company
[c]Emulsion "Airflex TR-120" sold by Air Products and Chemicals, Inc.
[d]Vinyl acetate/acrylic copolymer emulsion "Polyco 2114" sold by Borden Chemical, Division of Borden, Inc.
[e]One percent solution of "Polyhall 295" polyacrylamide sold by Stein, Hall & Company
[f]"Cymel 303" produced by American Cyanamid Company

EXAMPLE 4

A coating composition was prepared in accordance with the method described in Example 1 except that 40 parts by weight of "Polyco 2114" and 6 parts by weight of a 1% solution of "Polyhall 295" were used. Beverage bottles (10-ounce capacity) were coated with the resulting composition and cured in a force-air oven programmed at about 270° F. for 1.5 minutes, about 275° F. for 1 minute, and about 440° F. for 1.5 minutes for a total residence time of 4 minutes.

The bottles were drop tested in the manner described in Example 3 and the results are shown in Table I.

EXAMPLE 5

A containment coating composition was prepared in accordance with U.S. Pat. No. 3,772,061. To "Hycar 2600 × 138" (100 parts by weight) was added "Cymel 301" (4 parts by weight), and a 1% by weight solution of "Polyhall 295" (5 parts by weight). The resulting mixture was agitated at low speed until all of the components were uniformly distributed. Aqueous ammonium hydroxide solution was added to adjust the pH of the mixture to above 8.0. A beverage bottle was dip coated with the resulting composition and the wet film thus formed was cured at 400° F. for 10 minutes. The cured film was exposed to a solution of 2.5% sodium hydroxide and 0.5% trisodium phosphate at 120° F. for 30 minutes. After such exposure, the film showed very slight blush and no tack along with good tear resistance.

The bottles were drop tested in the manner described in Example 3 and the results are shown in Table I.

EXAMPLE 6

A coating composition was prepared in accordance with the method described in Example 1. Beverage bottles (10-ounce capacity) were dip coated with the composition and cured in a forced-air oven programmed at about 210° F. for 1.5 minutes, about 275° F. for 1 minute, and about 440° F. for 1.5 minutes for a total residence time of 4 minutes.

The bottles were drop tested in the manner described in Example 3 and the results are shown in Table I.

EXAMPLE 7

To "Hycar 2600 × 138" (100 parts by weight), was added "Polyco 2114" (20 parts by weight), "Airflex TR-120" (10 parts by weight), "Cymel 303" (4 parts by weight), and a 1% by weight solution of "Polyhall 295" (6 parts by weight). The resulting mixture was agitated at low speed until all of the components were uniformly distributed. Aqueous ammonium hydroxide solution was added to adjust the pH of the mixture to above 8.0. Beverage bottles were dip coated with the resulting composition and the wet films thus formed were cured in a forced-air oven programmed at about 210° F. for 1.5 minutes, 275° F. for 1 minute, and about 440° F. for 1.5 minutes for a total residence time of 4 minutes.

The bottles were drop tested in the manner described in Example 3 and the results set forth in Table I.

EXAMPLE 8

To "Hycar 2600 × 138" (100 parts by weight), was added an ethylene/vinyl acetate latex sold under the trade designation of "Elvax D-1122" by E. I. du Pont de Nemours & Company (33 parts by weight), "Cymel 303" (4 parts by weight) and a 1% by weight solution of "Polyhall 295" (6 parts by weight). The resulting mixture was agitated at low speed until all of the components were uniformly distributed. Aqueous ammonium hydroxide solution was added to adjust the pH of the mixture to above 8.0. A beverage bottle was dip coated with the resulting composition and the wet film thus formed was cured at 400° F. for 8 minutes. This coated bottle was exposed to a solution of 2.5% sodium hydroxide and 0.5% trisodium phosphate at 120° F. for 60 minutes. After such exposure the coating showed slight blush, no tack, and good adhesion.

EXAMPLE 9

To "Hycar 2600 × 138" (100 parts by weight) was added "Polyco 2114" (25 parts by weight), "Cymel 303" (4 parts by weight), a 1% by weight solution of "Polyhall 295" (4 parts by weight), and an emulsion of carnauba wax (5.6 parts by weight). The wax emulsion was composed of 13.9 parts by weight of carnauba wax, 1.6 parts by weight of stearic acid, 1.2 parts by weight of morpholine, and 83.3 parts by weight of water. The resulting mixture was agitated at low speed until all of the components were uniformly distributed. Beverage bottles were dip coated with the resulting composition and the wet film thus formed was cured at 350° F. for 7 minutes. After the coating was cured, a thin layer of polyethylene was sprayed over the outside of the bottle to improve lubricity.

Lubricity tests were conducted using three bottles prepared in accordance with this example. Two of the bottles were placed in a contiguous horizontal relationship on a flat supporting surface while the third bottle was cradled horizontally upon the first two bottles in the nip between them. The support surface was then gradually tilted and the angle of tilt determined at which the top bottle commenced to slide along the other two. This angle is referred to as the lubricity angle. The bottles of this example exhibited a lubricity angle of 16°–26°. By comparison, bottles of the type prepared in Example 1 and having a polyethylene overspray exhibit a lubricity angle of about 40°. Inclusion of a wax emulsion in the coating composition thus provides a material improvement in lubricity.

In view of the above, it will be seen that the several objects of the invention are achieved and other advantageous results attained.

As various changes could be made in the above methods and products without departing from the scope of the invention, it is intended that all matter contined in the above description shall be interpreted as illustrative and not in a limiting sense.

What is claimed is:

1. A glass container having adhered to the outside surface thereof a cured coating, said coating being derived from curing of a coating composition comprising:
   an acrylate latex, said acrylate latex containing a particulate resin comprising a copolymer of acrylonitrile and ethyl acrylate;
   up to about 40 parts by weight per 100 parts by weight of said acrylate latex of a vinyl latex containing a particulate resin comprising a copolymer of ethylene and vinyl acetate and up to about 40 parts by weight per 100 parts by weight of said acrylate latex of a vinyl/acrylic latex containing a particulate resin comprising a copolymer of vinyl acetate and a lower alkyl acrylate, the sum of the proportions of said vinyl latex and said vinyl/acrylic latex being between about 15 and about 40 parts by weight per 100 parts by weight of said acrylate latex and the total resin solids of said composition being at least about 45% by weight;
   between about 1.8 and 7.5 parts by weight per 100 parts by weight of said acrylate latex of a cross-linking agent selected from the group consisting of hexamethoxymethylmelamine and a methylated urea-formaldehyde resin; and a proportion of a thickening agent selected from the group consisting of polyacrylamide and a high molecular weight water-soluble polyethylene oxide resin sufficient to impart to said composition a Brookfield viscosity of between about 2,000 and 9,000 cps at 1 rpm and a Brookfield viscosity of between about 600 and about 2,400 cps at 5 rpm.

2. A container as set forth in claim 1 wherein each of the latexes from which the composition is derived contains at least about 45 % by weight solids.

3. A container as set forth in claim 2 wherein the sum of the proportions of said vinyl latex and said vinyl/acrylic latex is on the order of 25 parts by weight per 100 parts by weight of said acrylate latex.

4. A container as set forth in claim 3 wherein said composition contains approximately 25 parts by weight of said vinyl/acrylic latex per 100 parts by weight of said acrylate latex.

5. A container as set forth in claim 4 wherein said composition contains on the order of 4 parts by weight hexamethoxymethylmelamine and 0.04 parts by weight polyacrylamide per 100 parts by weight of said acrylate latex.

6. A container as set forth in claim 1 having a layer of polyethylene adhered to the outside surface of the cured coating.

* * * * *